(12) United States Patent
Sheng et al.

(10) Patent No.: US 10,386,968 B2
(45) Date of Patent: *Aug. 20, 2019

(54) METHOD AND APPARATUS FOR ACTIVE ULTRASONIC TOUCH DEVICES

(71) Applicant: Sentons Inc., San Jose, CA (US)

(72) Inventors: Samuel W. Sheng, Saratoga, CA (US);
Shih-Ming Shih, San Jose, CA (US);
Yenyu Hsieh, San Jose, CA (US)

(73) Assignee: Sentons Inc. (KY)

(*) Notice: Subject to any disclaimer, the term of this patent is extended or adjusted under 35 U.S.C. 154(b) by 0 days.

This patent is subject to a terminal disclaimer.

(21) Appl. No.: 15/231,593

(22) Filed: Aug. 8, 2016

(65) Prior Publication Data

US 2017/0031531 A1 Feb. 2, 2017
US 2019/0212876 A9 Jul. 11, 2019

Related U.S. Application Data

(63) Continuation of application No. 13/451,288, filed on Apr. 19, 2012, now Pat. No. 9,477,350.

(60) Provisional application No. 61/479,331, filed on Apr. 26, 2011, provisional application No. 61/594,255, filed on Feb. 2, 2012.

(51) Int. Cl.
*G06F 3/043* (2006.01)
*G06F 3/041* (2006.01)

(52) U.S. Cl.
CPC .......... *G06F 3/0436* (2013.01); *G06F 3/0418* (2013.01); *G06F 3/043* (2013.01)

(58) Field of Classification Search
CPC .......... G06F 3/043; G06F 3/01; G06F 3/0436; G06F 3/0418; G08C 21/00; G09G 5/00; G06K 11/14

USPC .................................................. 345/173–177
See application file for complete search history.

(56) References Cited

U.S. PATENT DOCUMENTS

| | | |
|---|---|---|
| 3,912,880 A | 10/1975 | Powter |
| 4,529,959 A | 7/1985 | Ito |
| 4,594,695 A | 6/1986 | Garconnat |
| 4,966,150 A | 10/1990 | Etienne |
| 5,074,152 A | 12/1991 | Ellner |
| 5,091,406 A | 2/1992 | Toda |

(Continued)

FOREIGN PATENT DOCUMENTS

| | | |
|---|---|---|
| CN | 103677339 | 7/2017 |
| EP | 2315101 A1 | 4/2011 |

(Continued)

OTHER PUBLICATIONS

T Benedict et al. 'The joint estimation of signal and noise from the sum envelope.' IEEE Transactions on Information Theory 13.3, pp. 447-454. Jul. 1, 1967.

*Primary Examiner* — Kent Chang
*Assistant Examiner* — Sujit Shah
(74) *Attorney, Agent, or Firm* — Van Pelt, Yi & James LLP

(57) ABSTRACT

A system for determining a user indication is disclosed. The system includes a communication interface configured to send a signal to be used to propagate a freely propagating signal through a propagating medium with a surface and receive the freely propagating signal that has been disturbed by a disturbance on the surface. The system also includes a processor coupled to the communication interface and configured to process the received signal to determine a user indication associated with the disturbance.

20 Claims, 6 Drawing Sheets

(56) References Cited

U.S. PATENT DOCUMENTS

| | | | |
|---|---|---|---|
| 5,233,873 A | 8/1993 | Mozgowiec | |
| 5,334,805 A * | 8/1994 | Knowles | G06F 3/0436 |
| | | | 178/18.04 |
| 5,451,723 A | 9/1995 | Huang | |
| 5,563,849 A * | 10/1996 | Hall | G01S 3/8083 |
| | | | 367/127 |
| 5,591,945 A | 1/1997 | Kent | |
| 5,635,643 A | 6/1997 | Maji | |
| 5,637,839 A * | 6/1997 | Yamaguchi | G06F 3/0433 |
| | | | 178/18.04 |
| 5,638,093 A | 6/1997 | Takahashi | |
| 5,854,450 A | 12/1998 | Kent | |
| 6,211,772 B1 | 4/2001 | Murakami | |
| 6,236,391 B1 | 5/2001 | Kent | |
| 6,262,946 B1 | 7/2001 | Khuri-Yakub | |
| 6,307,942 B1 | 10/2001 | Azima | |
| 6,498,603 B1 | 12/2002 | Wallace | |
| 6,507,772 B1 | 1/2003 | Gomes | |
| 6,922,642 B2 | 7/2005 | Sullivan | |
| 8,059,107 B2 | 11/2011 | Hill | |
| 8,194,051 B2 | 6/2012 | Wu | |
| 8,418,083 B1 | 4/2013 | Lundy | |
| 8,519,982 B2 | 8/2013 | Camp, Jr. | |
| 8,787,599 B2 | 7/2014 | Grattan | |
| 8,791,899 B1 | 7/2014 | Usey | |
| 9,041,662 B2 | 5/2015 | Harris | |
| 9,099,971 B2 | 8/2015 | Lynn et al. | |
| 9,189,109 B2 | 11/2015 | Sheng | |
| 9,250,742 B1 | 2/2016 | Usey | |
| 9,348,468 B2 | 5/2016 | Altekar | |
| 9,477,350 B2 | 10/2016 | Sheng | |
| 9,594,450 B2 | 3/2017 | Lynn | |
| 9,983,718 B2 | 5/2018 | Sheng | |
| 10,209,825 B2 | 2/2019 | Sheng | |
| 2002/0036621 A1 | 3/2002 | Liu | |
| 2002/0047833 A1 | 4/2002 | Kitada | |
| 2003/0161484 A1 | 8/2003 | Kanamori | |
| 2003/0164820 A1 | 9/2003 | Kent | |
| 2003/0189745 A1 | 10/2003 | Kikuchi | |
| 2004/0203594 A1 | 10/2004 | Kotzin | |
| 2004/0246239 A1 * | 12/2004 | Knowles | G06F 3/0436 |
| | | | 345/177 |
| 2005/0063553 A1 | 3/2005 | Ozawa | |
| 2005/0146511 A1 | 7/2005 | Hill | |
| 2005/0146512 A1 | 7/2005 | Hill | |
| 2005/0174338 A1 * | 8/2005 | Ing | G06F 3/0433 |
| | | | 345/177 |
| 2005/0226455 A1 | 10/2005 | Aubauer | |
| 2005/0229713 A1 | 10/2005 | Niblock | |
| 2005/0248540 A1 | 11/2005 | Newton | |
| 2006/0071912 A1 * | 4/2006 | Hill | G06F 3/0416 |
| | | | 345/173 |
| 2006/0109261 A1 | 5/2006 | Chou | |
| 2006/0114233 A1 | 6/2006 | Radivojevic et al. | |
| 2006/0139339 A1 | 6/2006 | Pechman | |
| 2006/0152499 A1 | 7/2006 | Roberts | |
| 2006/0197753 A1 | 9/2006 | Hotelling | |
| 2006/0279548 A1 | 12/2006 | Geaghan | |
| 2006/0284841 A1 | 12/2006 | Hong | |
| 2007/0019825 A1 | 1/2007 | Marumoto | |
| 2007/0109274 A1 * | 5/2007 | Reynolds | G06F 3/041 |
| | | | 345/173 |
| 2007/0165009 A1 | 7/2007 | Sakurai | |
| 2007/0171212 A1 | 7/2007 | Sakurai | |
| 2007/0183520 A1 | 8/2007 | Kim | |
| 2007/0214462 A1 | 9/2007 | Boillot | |
| 2007/0240913 A1 | 10/2007 | Schermerhorn | |
| 2007/0278896 A1 | 12/2007 | Sarkar | |
| 2008/0018618 A1 * | 1/2008 | Hill | G06F 3/0436 |
| | | | 345/177 |
| 2008/0062151 A1 | 3/2008 | Kent | |
| 2008/0169132 A1 | 7/2008 | Ding | |
| 2008/0231612 A1 * | 9/2008 | Hill | G06F 3/0436 |
| | | | 345/177 |
| 2008/0259030 A1 | 10/2008 | Holtzman | |
| 2008/0266266 A1 | 10/2008 | Kent | |
| 2009/0009488 A1 | 1/2009 | D'Souza | |
| 2009/0116661 A1 | 5/2009 | Hetherington | |
| 2009/0237372 A1 | 9/2009 | Kim et al. | |
| 2009/0309853 A1 | 12/2009 | Hildebrandt | |
| 2009/0315848 A1 | 12/2009 | Ku | |
| 2010/0027810 A1 | 2/2010 | Marton | |
| 2010/0044121 A1 | 2/2010 | Simon et al. | |
| 2010/0117933 A1 | 5/2010 | Gothard | |
| 2010/0117993 A1 * | 5/2010 | Kent | G06F 3/0418 |
| | | | 345/177 |
| 2010/0141408 A1 | 6/2010 | Doy | |
| 2010/0165215 A1 | 7/2010 | Shim | |
| 2010/0185989 A1 | 7/2010 | Shiplacoff et al. | |
| 2010/0245265 A1 | 9/2010 | Sato et al. | |
| 2010/0269040 A1 | 10/2010 | Lee | |
| 2010/0309139 A1 | 12/2010 | Ng | |
| 2010/0321312 A1 | 12/2010 | Han et al. | |
| 2010/0321325 A1 | 12/2010 | Springer | |
| 2011/0001707 A1 | 1/2011 | Faubert | |
| 2011/0001708 A1 | 1/2011 | Sleeman | |
| 2011/0013785 A1 | 1/2011 | Kim | |
| 2011/0025649 A1 | 2/2011 | Sheikhzadeh | |
| 2011/0084937 A1 | 4/2011 | Chang | |
| 2011/0155479 A1 | 6/2011 | Oda | |
| 2011/0175813 A1 | 7/2011 | Sarwar et al. | |
| 2011/0182443 A1 | 7/2011 | Gant | |
| 2011/0191680 A1 | 8/2011 | Chae | |
| 2011/0213223 A1 | 9/2011 | Kruglick | |
| 2011/0222372 A1 | 9/2011 | O'Donovan | |
| 2011/0225549 A1 | 9/2011 | Kim | |
| 2011/0234545 A1 | 9/2011 | Tanaka | |
| 2011/0279382 A1 | 11/2011 | Pertuit | |
| 2011/0300845 A1 | 12/2011 | Lee | |
| 2011/0304577 A1 | 12/2011 | Brown | |
| 2011/0316784 A1 | 12/2011 | Bisutti | |
| 2011/0316790 A1 | 12/2011 | Ollila et al. | |
| 2012/0001875 A1 * | 1/2012 | Li | G01S 7/5273 |
| | | | 345/177 |
| 2012/0002820 A1 | 1/2012 | Leichter | |
| 2012/0007837 A1 | 1/2012 | Kent | |
| 2012/0030628 A1 | 2/2012 | Lee | |
| 2012/0032928 A1 | 2/2012 | Alberth | |
| 2012/0062564 A1 | 3/2012 | Miyashita et al. | |
| 2012/0068970 A1 | 3/2012 | Pemberton-Pigott | |
| 2012/0088548 A1 | 4/2012 | Yun et al. | |
| 2012/0092964 A1 | 4/2012 | Badiey | |
| 2012/0126962 A1 | 5/2012 | Uji et al. | |
| 2012/0140954 A1 | 6/2012 | Ranta | |
| 2012/0144293 A1 | 6/2012 | Kim | |
| 2012/0149437 A1 | 6/2012 | Zurek | |
| 2012/0188194 A1 | 7/2012 | Sulem | |
| 2012/0206154 A1 | 8/2012 | Pant | |
| 2012/0235866 A1 | 9/2012 | Kim | |
| 2012/0242603 A1 | 9/2012 | Engelhardt | |
| 2012/0270605 A1 | 10/2012 | Garrone | |
| 2012/0278490 A1 | 11/2012 | Sennett | |
| 2012/0282944 A1 | 11/2012 | Zhao | |
| 2012/0300956 A1 | 11/2012 | Horii | |
| 2012/0306823 A1 | 12/2012 | Pance | |
| 2013/0011144 A1 | 1/2013 | Amiri | |
| 2013/0050133 A1 | 2/2013 | Brakensiek | |
| 2013/0050154 A1 | 2/2013 | Guy | |
| 2013/0057491 A1 | 3/2013 | Chu | |
| 2013/0059532 A1 | 3/2013 | Mahanfar et al. | |
| 2013/0082970 A1 | 4/2013 | Frey | |
| 2013/0127755 A1 | 5/2013 | Lynn | |
| 2013/0141365 A1 | 6/2013 | Lynn | |
| 2013/0147768 A1 | 6/2013 | Aroyan | |
| 2013/0194208 A1 | 8/2013 | Miyanaka | |
| 2013/0222274 A1 | 8/2013 | Mori | |
| 2013/0234995 A1 | 9/2013 | Son | |
| 2014/0028576 A1 | 1/2014 | Shahparnia | |
| 2014/0078070 A1 | 3/2014 | Armstrong-Muntner | |
| 2014/0078086 A1 | 3/2014 | Bledsoe | |
| 2014/0078109 A1 | 3/2014 | Armstrong-Muntner | |
| 2014/0078112 A1 | 3/2014 | Sheng | |
| 2014/0247230 A1 | 9/2014 | Sheng | |

(56) References Cited

U.S. PATENT DOCUMENTS

| | | |
|---|---|---|
| 2014/0247250 A1 | 9/2014 | Sheng |
| 2014/0317722 A1 | 10/2014 | Tartz |
| 2014/0362055 A1 | 12/2014 | Altekar |
| 2014/0368464 A1 | 12/2014 | Singnurkar |
| 2015/0002415 A1 | 1/2015 | Lee |
| 2015/0009185 A1 | 1/2015 | Shi |
| 2015/0109239 A1 | 4/2015 | Mao |
| 2015/0199035 A1 | 7/2015 | Chang |
| 2015/0253895 A1 | 9/2015 | Kim |
| 2015/0346850 A1 | 12/2015 | Vandermeijden |
| 2015/0366504 A1 | 12/2015 | Connor |
| 2016/0070404 A1 | 3/2016 | Kerr |
| 2016/0091308 A1 | 3/2016 | Oliaei |
| 2016/0162044 A1 | 6/2016 | Ciou |
| 2016/0179249 A1 | 6/2016 | Ballan |
| 2016/0209944 A1 | 7/2016 | Shim |
| 2016/0282312 A1 | 9/2016 | Cable |
| 2016/0282965 A1 | 9/2016 | Jensen |
| 2016/0349922 A1 | 12/2016 | Choi |
| 2017/0010697 A1 | 1/2017 | Jiang |
| 2017/0020402 A1 | 1/2017 | Rogers |
| 2017/0083164 A1 | 3/2017 | Sheng |
| 2018/0032211 A1 | 2/2018 | King |

FOREIGN PATENT DOCUMENTS

| | | |
|---|---|---|
| EP | 2315101 B1 | 1/2014 |
| JP | H07160355 | 6/1995 |
| JP | 2005092527 A | 4/2005 |
| JP | 5723499 | 5/2015 |
| KR | 20110001839 | 1/2011 |
| WO | WO-03005292 A1 | 1/2003 |
| WO | 2006131022 A1 | 12/2006 |
| WO | 2009028680 A1 | 3/2009 |
| WO | 2014066621 | 6/2014 |
| WO | WO-2014209757 A1 | 12/2014 |
| WO | WO-2015027017 | 2/2015 |
| WO | 2015127167 | 8/2015 |

* cited by examiner

METHOD AND APPARATUS FOR ACTIVE ULTRASONIC TOUCH DEVICES

CROSS REFERENCE TO OTHER APPLICATIONS

This application is a continuation of co-pending U.S. patent application Ser. No. 13/451,288 entitled METHOD AND APPARATUS FOR ACTIVE ULTRASONIC TOUCH DEVICES filed Apr. 19, 2012, which claims priority to U.S. Provisional Patent Application No. 61/479,331 entitled METHOD AND APPARATUS FOR ACTIVE ULTRASONIC TOUCH DEVICES filed Apr. 26, 2011, both of which are incorporated herein by reference for all purposes. U.S. patent application Ser. No. 13/451,288 also claims priority to U.S. Provisional Patent Application No. 61/594,255 entitled TOUCH SCREEN DEVICE SIGNAL DESIGNS AND METHODD filed Feb. 2, 2012, which is incorporated herein by reference for all purposes.

BACKGROUND OF THE INVENTION

Various technologies have been used to detect a touch input on a display area. The most popular technologies today include capacitive and resistive touch detection technology. Using resistive touch technology, often a glass panel is coated with multiple conductive layers that register touches when physical pressure is applied to the layers to force the layers to make physical contact. Using capacitive touch technology, often a glass panel is coated with material that can hold an electrical charge sensitive to a human finger. By detecting the change in the electrical charge due to a touch, a touch location can be detected. However, with resistive and capacitive touch detection technologies, the glass screen is required to be coated with a material that reduces the clarity of the glass screen. Additionally, because the entire glass screen is required to be coated with a material, manufacturing and component costs can become prohibitively expensive as larger screens are desired.

Another type of touch detection technology includes surface acoustic wave technology. One example includes the Elo Touch Systems Acoustic Pulse Recognition, commonly called APR, manufactured by Elo Touch Systems of 301 Constitution Drive, Menlo Park, Calif. 94025. The APR system includes transducers attached to the edges of a touchscreen glass that pick up the sound emitted on the glass due to a touch. However, the surface glass may pick up other external sounds and vibrations that reduce the accuracy and effectiveness of the APR system to efficiently detect a touch input. Another example includes the Surface Acoustic Wave-based technology, commonly called SAW, such as the Elo IntelliTouch Plus™ of Elo Touch Systems. The SAW technology sends ultrasonic waves in a guided pattern using reflectors on the touch screen to detect a touch. However sending the ultrasonic waves in the guided pattern increases costs and may be difficult to achieve. Additionally, detecting additional types of inputs, such as multi-touch inputs, may not be possible or may be difficult using SAW or APR technology. Therefore there exists a need for a better way to detect an input on a surface.

BRIEF DESCRIPTION OF THE DRAWINGS

Various embodiments of the invention are disclosed in the following detailed description and the accompanying drawings.

DETAILED DESCRIPTION

Figure 1:
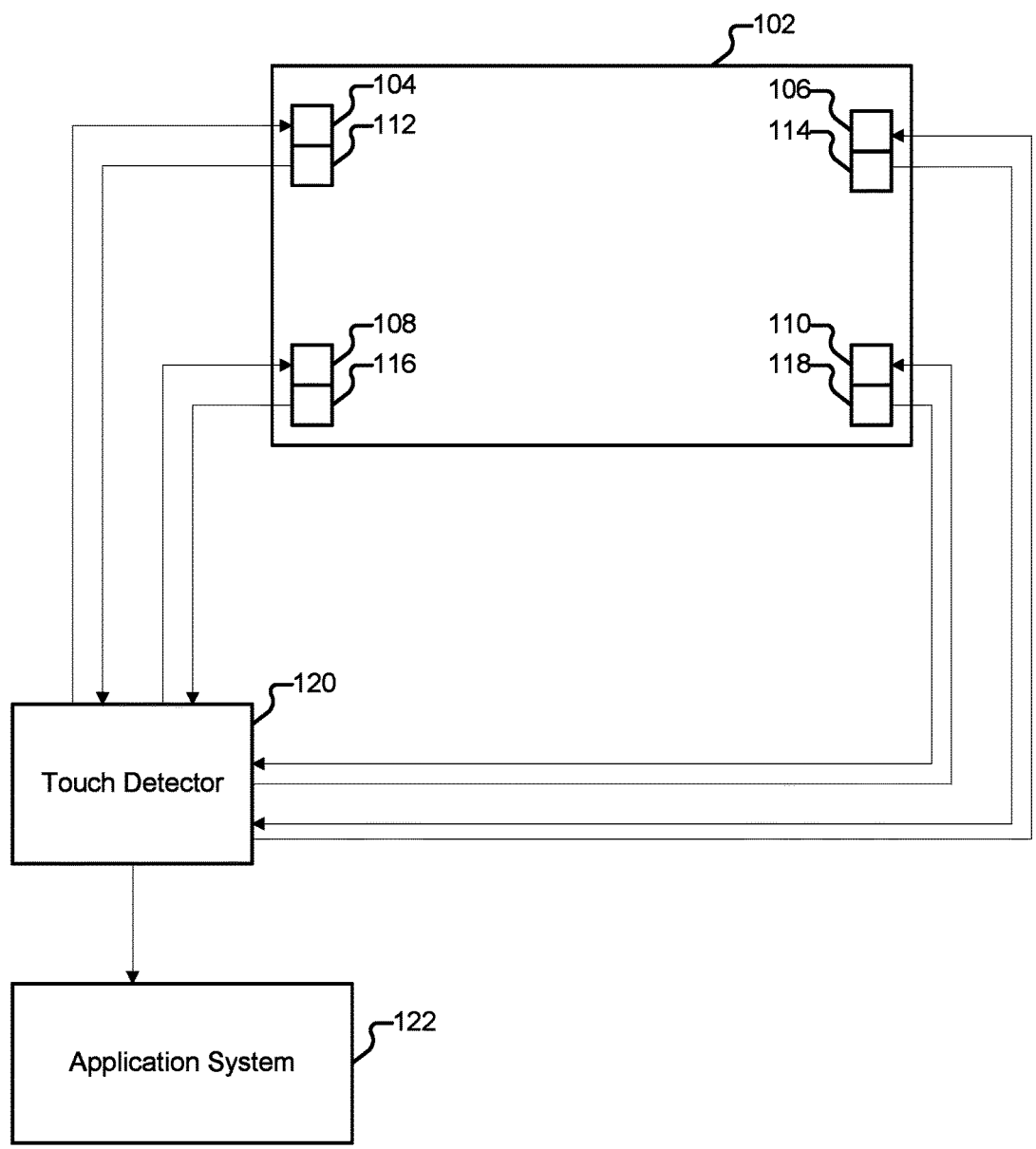
FIG. 1 is a block diagram illustrating an embodiment of a system for detecting a surface disturbance.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detecting disturbance on a surface is disclosed. For example, a user touch input on the glass surface of a display screen is detected. In some embodiments, a signal such as an acoustic or ultrasonic signal is propagated freely through a propagating medium with a surface using a transmitter coupled to the medium. When the surface is touched, the propagated signal is disturbed (e.g., the touch causes an interference with the propagated signal). In some embodiments, the disturbed signal is received at a sensor coupled to the propagating medium. By processing the received signal and comparing it against an expected signal without the disturbance, a location on the surface associated with the touch input is at least in part determined. For example, the disturbed signal is received at a plurality of sensors and a relative time difference between when the disturbed signal was received at different sensors is used to determine the location on the surface. In various embodiments, the touch includes a physical contact and/or close proximity (e.g., hovering) to a surface using a human finger, pen, pointer, stylus, and/or any other body parts or objects that can be used to contact or disturb the surface. In some embodiments, the touch includes an input gesture and/or a multi-touch input.

In some embodiments, the disturbed signal is used to determine one or more of the following associated with a touch input: a gesture, a coordinate position, a time, a time frame, a direction, a velocity, a force magnitude, a proximity magnitude, a pressure, a size, and other measurable or derived parameters. In some embodiments, by detecting disturbances of a freely propagated signal, touch input detection technology can be applied to larger surface regions with less or no additional costs due to a larger surface region as compared to certain previous touch detection technologies. Additionally, the optical transparency of a touch screen may not have to be affected as compared to resistive and capacitive touch technologies. Merely by way of example, the touch detection described herein can be applied to a variety of objects such as a kiosk, an ATM, a computing device, an entertainment device, a digital signage apparatus, a cell phone, a tablet computer, a point of sale terminal, a food and restaurant apparatus, a gaming device, a casino game and application, a piece of furniture, a vehicle, an industrial application, a financial application, a medical device, an appliance, and any other objects or devices having surfaces.

FIG. 1 is a block diagram illustrating an embodiment of a system for detecting a surface disturbance. In some embodiments, the system shown in FIG. 1 is included in a kiosk, an ATM, a computing device, an entertainment device, a digital signage apparatus, a cell phone, a tablet computer, a point of sale terminal, a food and restaurant apparatus, a gaming device, a casino game and application, a piece of furniture, a vehicle, an industrial application, a financial application, a medical device, an appliance, and any other objects or devices having surfaces. Propagating signal medium 102 is coupled to transmitters 104, 106, 108, and 110 and sensors 112, 114, 116, and 118. In various embodiments, the propagating medium includes one or more of the following: panel, table, glass, screen, door, floor, whiteboard, glass, plastic, wood, steel, metal, semiconductor, insulator, conductor, and any medium that is able to propagate an acoustic or ultrasonic signal. For example, medium 102 is glass of a display screen. A first surface of medium 102 includes a surface area where a user may touch to provide a selection input and a substantially opposite surface of medium 102 is coupled to the transmitters and sensors shown in FIG. 1. In various embodiments, a surface of medium 102 is substantially flat, curved, or combinations thereof and may be configured in a variety of shapes such as rectangular, square, oval, circular, trapezoidal, annular, or any combination of these, and the like.

Examples of transmitters 104, 106, 108, and 110 include piezoelectric transducers, electromagnetic transducer, transmitters, sensors and/or any other transmitters and transducers capable of propagating a signal through medium 102. Examples of sensors 112, 114, 116, and 118 include piezoelectric transducers, electromagnetic transducers, transmitters and/or any other sensors and transducers capable of detecting a signal on medium 102. In some embodiments, the transmitters and sensors shown in FIG. 1 are coupled to medium 102 in a manner that allows a user input to be detected in a predetermined region of medium 102. Although four transmitters and four sensors are shown, any number of transmitters and any number of sensors may be used in other embodiments. For example, two transmitters and three sensors may be used. In some embodiments, a single transducer acts as both a transmitter and a sensor. For example, transmitter 104 and sensor 112 represent a single piezoelectric transducer. In the example shown, sensor 104 may propagate a signal through medium 102. Sensors 112, 114, 116, and 118 receive the propagated signal. In another embodiment, the transmitters/sensors in FIG. 1 are included in a flexible cable coupled to medium 102 via an encapsulant and/or glue material and/or fasteners.

Touch detector 120 is connected to the transmitters and sensors shown in FIG. 1. In some embodiments, detector 120 includes one or more of the following: an integrated circuit chip, a printed circuit board, a processor, and other electrical components and connectors. Detector 120 determines and sends a signal to be propagated by transmitters 104, 106, 108, and 110. Detector 120 also receives the signal detected by sensors 112, 114, 116, and 118. The received signals are processed by detector 120 to determine whether a disturbance associated with a user input has been detected at a location on a surface of medium 102 associated with the disturbance. Detector 120 is in communication with application system 122. Application system 122 uses information provided by detector 120. For example, application system 122 receives from detector 120 a coordinate associated with a user touch input that is used by application system 122 to control a software application of application system 122. In some embodiments, application system 122 includes a processor and/or memory/storage. In other embodiments, detector 120 and application system 122 are at least in part included/processed in a single processor. An example of data provided by detector 120 to application system 122 includes one or more of the following associated with a user indication: a location coordinate of a surface of medium 102, a gesture, simultaneous user indications (e.g., multi-touch input), a time, a status, a direction, a velocity, a force magnitude, a proximity magnitude, a pressure, a size, and other measurable or derived information.

Figure 2:
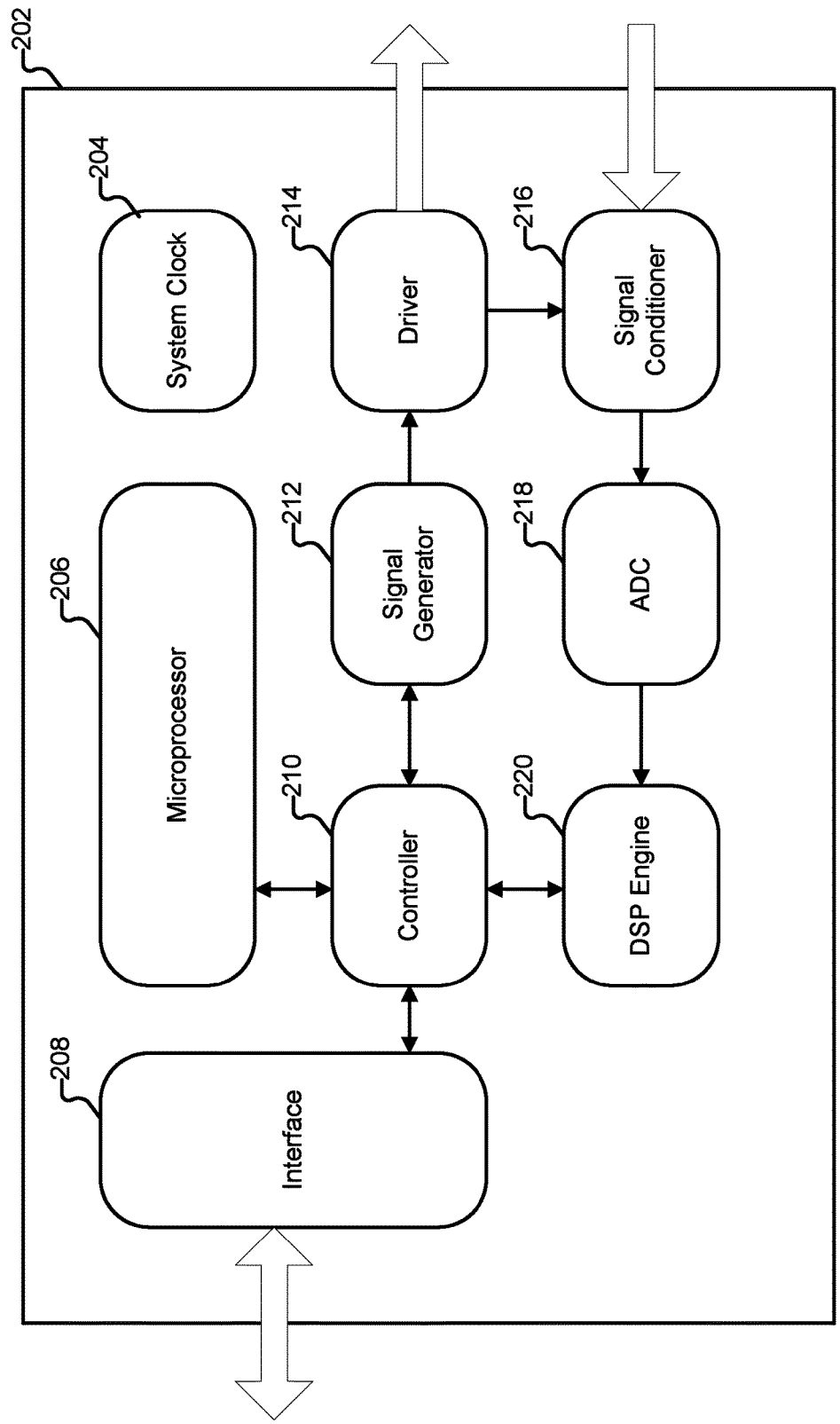
FIG. 2 is a block diagram illustrating an embodiment of a system for detecting a touch input.

FIG. 2 is a block diagram illustrating an embodiment of a system for detecting a touch input. In some embodiments, touch detector 202 is included in touch detector 120 of FIG. 1. In some embodiments, the system of FIG. 2 is integrated in an integrated circuit chip. Touch detector 202 includes system clock 204 that provides a synchronous system time source to one or more other components of detector 202. Controller 210 controls data flow and/or commands between microprocessor 206, interface 208, DSP engine 220, and signal generator 212. In some embodiments, microprocessor 206 processes instructions and/or calculations that can be used to program software/firmware and/or process data of detector 202. In some embodiments, a memory is coupled to microprocessor 206 and is configured to provide microprocessor 206 with instructions. Signal generator 212 generates a signal to be used to propagate a signal such as a signal propagated by transmitter 104 of FIG. 1. For example, signal generator 212 generates a pseudorandom binary sequence signal. Driver 214 receives the signal from generator 212 and drives one or more transmitters, such as transmitters 104, 106, 108, and 110 of FIG. 1, to propagate a signal through a medium.

A signal detected from a sensor such as sensor 112 of FIG. 1 is received by detector 202 and signal conditioner 216 conditions (e.g., filters) the received analog signal for further processing. For example, signal conditioner 216 receives the signal outputted by driver 214 and performs echo cancellation of the signal received by signal conditioner 216. The conditioned signal is converted to a digital signal by analog-to-digital converter 218. The converted signal is processed by digital signal processor engine 220. For example, DSP engine 220 correlates the converted signal against a reference signal. The result of the correlation may be used by microprocessor 206 to determine a location associated with a user touch input. Interface 208 provides an interface for microprocessor 206 and controller 210 that allows an external component to access and/or control detector 202. For example, interface 208 allows detector 202 to communicate with application system 122 of FIG. 1 and provides the application system with location information associated with a user touch input.

Figure 3:
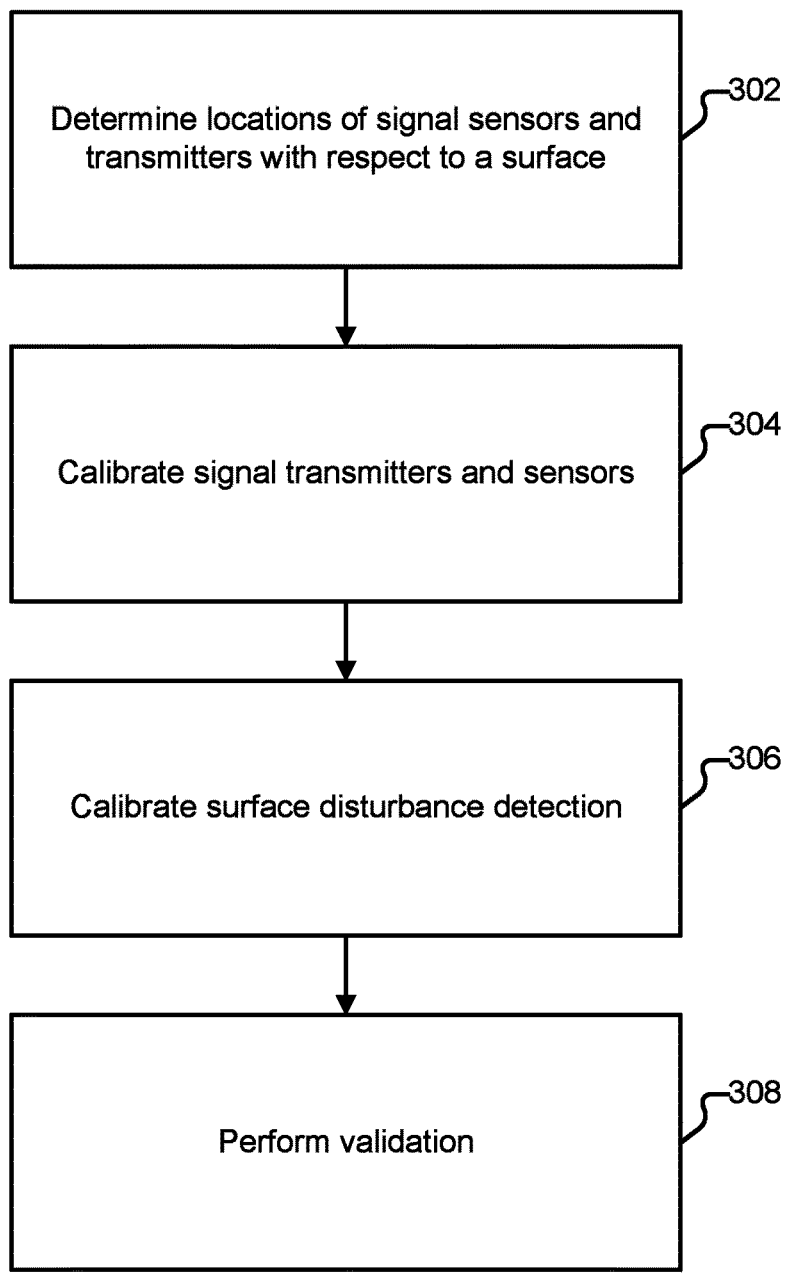
FIG. 3 is a flow chart illustrating an embodiment of a process for calibrating and validating touch detection.

FIG. 3 is a flow chart illustrating an embodiment of a process for calibrating and validating touch detection. In some embodiments, the process of FIG. 1 is used at least in part to calibrate and validate the system of FIG. 1 and/or the system of FIG. 2. At 302, locations of signal transmitters and sensors with respect to a surface are determined. For example, locations of transmitters and sensors shown in FIG. 1 are determined with respect to their location on a surface of medium 102. In some embodiments, determining the locations includes receiving location information. In various embodiments, one or more of the locations may be fixed and/or variable.

At 304, signal transmitters and sensors are calibrated. In some embodiments, calibrating the transmitter includes calibrating a characteristic of a signal driver and/or transmitter (e.g., strength). In some embodiments, calibrating the sensor includes calibrating a characteristic of a sensor (e.g., sensitivity). In some embodiments, the calibration of 304 is performed to optimize the coverage and improve signal to noise transmission/detection of a signal (e.g., acoustic or ultrasonic) to be propagated through a medium and/or a disturbance to be detected. For example, one or more components of the system of FIG. 1 and/or the system of FIG. 2 are tuned to meet a signal-to-noise requirement. In some embodiments, the calibration of 304 depends on the size and type of a transmission/propagation medium and geometric configuration of the transmitters/sensors. In some embodiments, the calibration of step 304 includes detecting a failure or aging of a transmitter or sensor. In some embodiments, the calibration of step 304 includes cycling the transmitter and/or receiver. For example, to increase the stability and reliability of a piezoelectric transmitter and/or receiver, a burn-in cycle is performed using a burn-in signal. In some embodiments, the step of 304 includes configuring at least one sensing device within a vicinity of a predetermined spatial region to capture an indication associated with a disturbance using the sensing device. The disturbance is caused in a selected portion of the input signal corresponding to a selection portion of the predetermined spatial region.

At 306, surface disturbance detection is calibrated. In some embodiments, a test signal is propagated through a medium such as medium 102 of FIG. 1 to determine an expected sensed signal when no disturbance has been applied. In some embodiments, a test signal is propagated through a medium to determine a sensed signal when one or more predetermined disturbances (e.g., predetermined touch) are applied at a predetermined location. Using the sensed signal, one or more components may be adjusted to calibrate the disturbance detection.

At 308, a validation of a touch detection system is performed. For example, the system of FIG. 1 and/or FIG. 2 is testing using predetermined disturbance patterns to determine detection accuracy, detection resolution, multi-touch detection, and/or response time. If the validation fails, the process of FIG. 3 may be at least in part repeated and/or one or more components may be adjusted before performing another validation.

Figure 4:
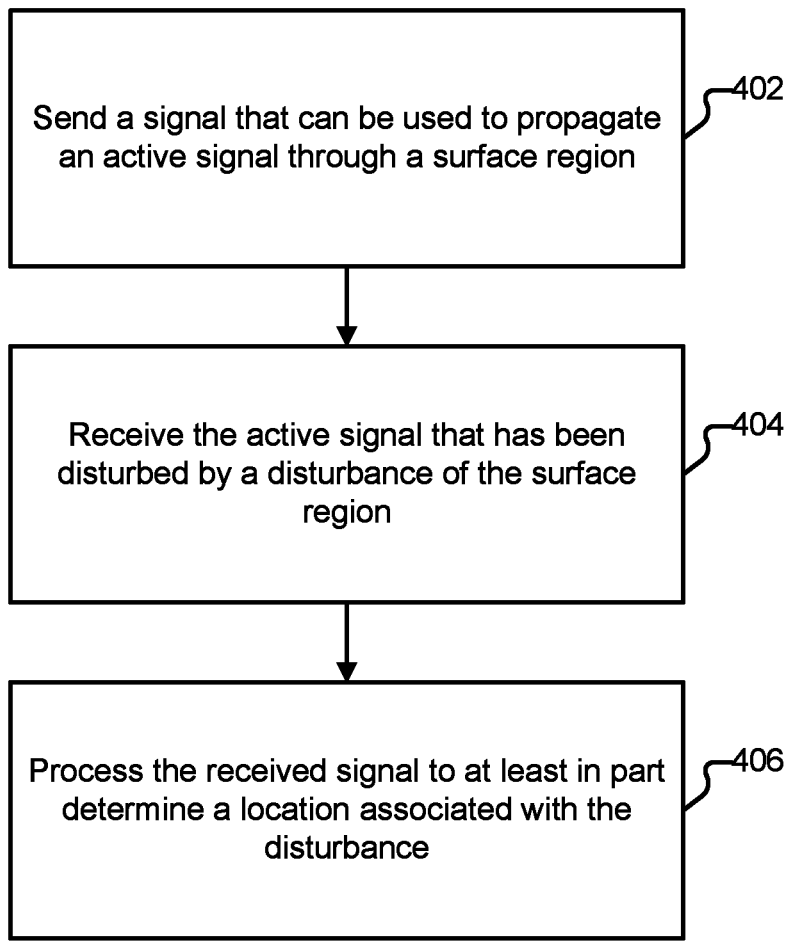
FIG. 4 is a flow chart illustrating an embodiment of a process for detecting a user touch input.

FIG. 4 is a flow chart illustrating an embodiment of a process for detecting a user touch input. In some embodiments, the process of FIG. 4 is at least in part implemented on touch detector 120 of FIG. 1 and/or touch detector 202 of FIG. 2. At 402, a signal that can be used to propagate an active signal through a surface region is sent. In some embodiments, sending the signal includes driving (e.g., using driver 214 of FIG. 2) a transmitter such as a transducer (e.g., transmitter 104 of FIG. 1) to propagate an active signal (e.g., acoustic or ultrasonic) through a propagating medium with the surface region. In some embodiments, the signal includes a sequence selected to optimize autocorrelation (e.g., resulting in narrow/short peak) of the signal. For example, the signal includes a Zadoff-Chu sequence. In some embodiments, the signal includes a pseudorandom binary sequence with or without modulation. In some embodiments, the propagated signal is an acoustic signal. In some embodiments, the propagated signal is an ultrasonic signal (e.g., outside the range of human hearing). For example, the propagated signal is a signal above 20 kHz (e.g., within the range between 80 kHz to 100 kHz). In other embodiments, the propagated signal may be within the range of human hearing. In some embodiments, by using the active signal, a user input on or near the surface region can be detected by detecting disturbances in the active signal when it is received by a sensor on the propagating medium. By using an active signal rather merely listening passively for a user touch indication on the surface, other vibrations and disturbances that are not likely associated with a user touch indication can be more easily discerned/filtered out. In some embodiments, the active signal is used in addition to receiving a passive signal from a user input to determine the user input.

At 404, the active signal that has been disturbed by a disturbance of the surface region is received. The disturbance may be associated with a user touch indication. In some embodiments, the disturbance causes the active signal that is propagating through a medium to be detracted, attenuated, and/or delayed. In some embodiments, the disturbance in a selected portion of the active signal corresponds to a location on the surface that has been indicated (e.g., touched) by a user.

At 406, the received signal is processed to at least in part determine a location associated with the disturbance. In some embodiments, determining the location includes extracting a desired signal from the received signal at least in part by removing or reducing undesired components of the received signal such as disturbances caused by extraneous noise and vibrations not useful in detecting a touch input. In some embodiments, determining the location includes comparing the received signal to a reference signal that has not been affected by the disturbance. The result of the comparison may be used with a result of other comparisons performed using the reference signal and other signal(s) received at a plurality of sensors. The location, in some embodiments, is a location (e.g., a location coordinate) on the surface region where a user has provided a touch input. In addition to determining the location, one or more of the following information associated with the disturbance may be determined at 406: a gesture, simultaneous user indications (e.g., multi-touch input), a time, a status, a direction, a velocity, a force magnitude, a proximity magnitude, a pressure, a size, and other measurable or derived information. In some embodiments, the location is not determined at 406 if a location cannot be determined using the received signal and/or the disturbance is determined to be not associated with a user input. Information determined at 406 may be provided and/or outputted.

Although FIG. 4 shows receiving and processing an active signal that has been disturbed, in some embodiments, a received signal has not been disturbed by a touch input and the received signal is processed to determined that a touch input has not been detected. An indication that a touch input has not been detected may be provided/outputted.

Figure 5:
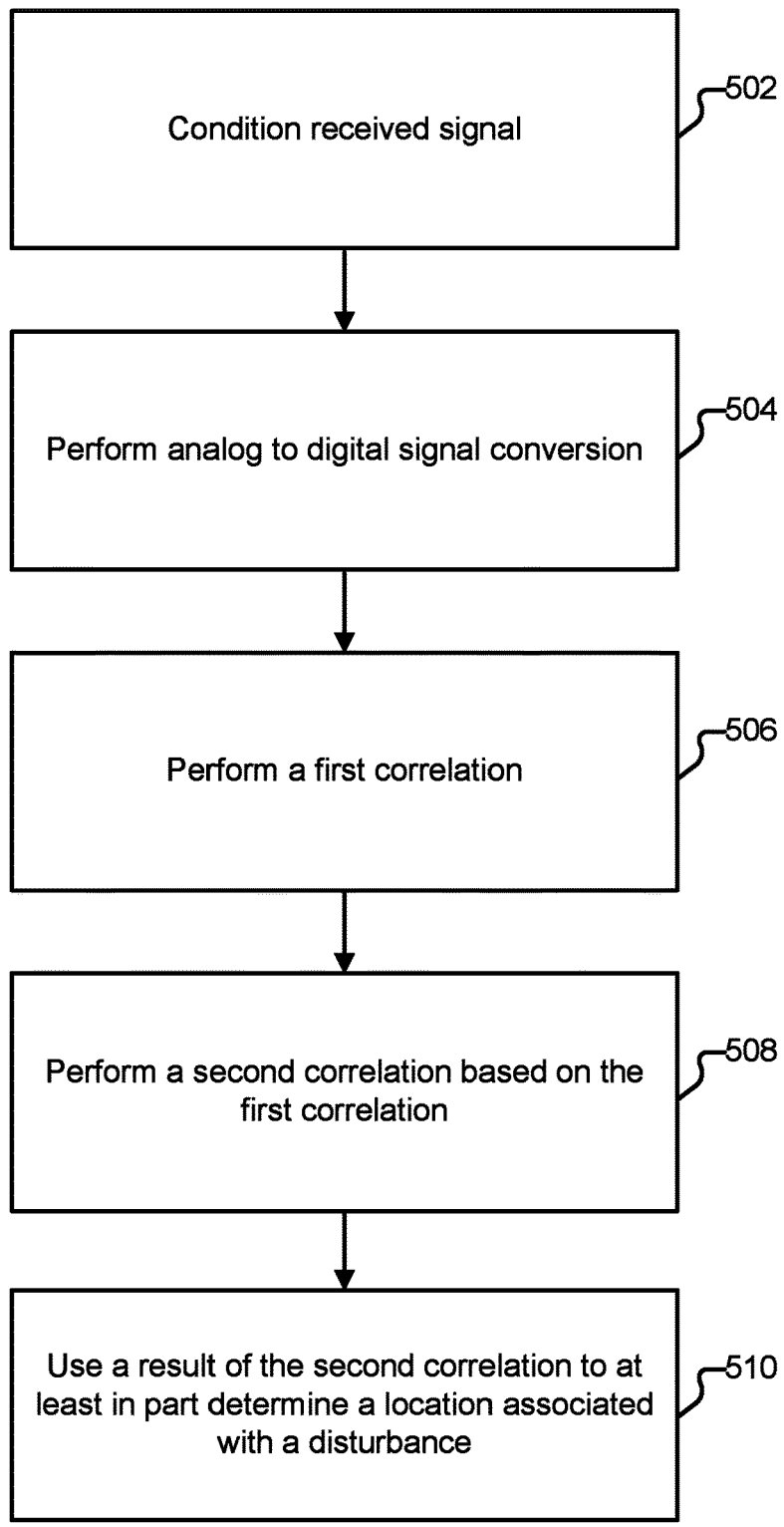
FIG. 5 is a flow chart illustrating an embodiment of a process for determining a location associated with a disturbance on a surface.

FIG. 5 is a flow chart illustrating an embodiment of a process for determining a location associated with a disturbance on a surface. In some embodiments, the process of FIG. 5 is included in 406 of FIG. 4. The process of FIG. 5 may be implemented in touch detector 120 of FIG. 1 and/or touch detector 202 of FIG. 2. At 502, a received signal is conditioned. In some embodiments, the received signal is a signal including a pseudorandom binary sequence that has been freely propagated through a medium with a surface that can be used to receive a user input. For example, the received signal is the signal that has been received at 404 of FIG. 4. In some embodiments, conditioning the signal includes filtering or otherwise modifying the received signal to improve signal quality (e.g., signal to noise ratio) for detection of a pseudorandom binary sequence included in the received signal and/or user touch input. In some embodiments, conditioning the received signal includes filtering out from the signal extraneous noise and/or vibrations not likely associated with a user touch indication.

At 504, an analog to digital signal conversion is performed on the signal that has been conditioned at 502. In various embodiments, any number of standard analog to digital signal converters may be used. The resulting digital signal is used to perform a first correlation at 506. In some embodiments, performing the first correlation includes correlating the converted signal with a reference signal. Performing the correlation includes cross-correlating or determining a convolution (e.g., interferometry) of the converted signal with a reference signal to measure the similarity of the two signals as a time-lag is applied to one of the signals. By performing the correlation, the location of a portion of the converted signal that most corresponds to the reference signal can be located. For example, a result of the correlation can be plotted as a graph of time within the received and converted signal (e.g., time-lag between the signals) vs. a measure of similarity. The associated time value of the largest value of the measure of similarity corresponds to the location where the two signals most correspond. By comparing this measured time value against a reference time value (e.g., determined at 306 of FIG. 3) not associated with a touch indication disturbance, a time delay/offset or phase difference caused on the received signal due to a disturbance caused by a touch input can be determined. In some embodiments, by measuring the amplitude/intensity difference of the received signal at the determined time vs. a reference signal, a pressure of a touch indication may be determined. In some embodiments, the reference signal is determined based at least in part on the signal that was propagated through a medium (e.g., based on a source pseudorandom binary sequence signal that was propagated). In some embodiments, the reference signal is at least in part determined using information determined during calibration at 306 of FIG. 3. The reference signal may be chosen so that calculations required to be performed during the correlation may be simplified. For example, the reference signal used in 506 is a simplified reference signal that can used to efficiently correlate the reference signal over a relatively large time difference (e.g., lag-time) between the received and converted signal and the reference signal.

At 508, a second correlation is performed based on a result of the first correlation. Performing the second correlation includes correlating (e.g., cross-correlation or convolution similar to step 506) the converted signal in 504 with a second reference signal. The second reference signal is a more complex/detailed (e.g., more computationally intensive) reference signal as compared to the first reference signal used in 506. In some embodiments, the second correlation is performed in 508 because using the second reference signal in 506 may be too computationally intensive for the time interval required to be correlated in 506. Performing the second correlation based on the result of the first correlation includes using one or more time values determined as a result of the first correlation. For example, using a result of the first correlation, a range of likely time values (e.g., time-lag) that most correlate between the received signal and the first reference signal is determined and the second correlation is performed using the second reference signal only across the determined range of time values to fine tune and determine the time value that most corresponds to where the second reference signal (and, by association, also the first reference signal) matched the received signal. In various embodiments, the first and second correlations have been used to determine a portion within the received signal that correspond to a disturbance caused by a touch input at a location on a surface of a propagating medium. In other embodiments, the second correlation is optional. For example, only a single correlation step is performed.

At 510, a result of the second correlation is used to at least in part determine a location associated with a disturbance. In some embodiments, determining the location includes comparing a determined time value where the signals of the second correlation are most correlated and comparing the determined time value with a reference time value (e.g., determined at 306 of FIG. 3) not associated with a touch input disturbance, to determine a time delay/offset or phase difference caused on the received signal due to the disturbance (e.g., caused by a touch input). This time delay is associated with a signal received at a first sensor and other time delays due to the disturbance at other signals received at other sensors are used to calculate a location of the disturbance relative to the locations of the sensors. By using the location of the sensors relative to a surface of a medium that has propagated the received signal, a location on the surface where the disturbance originated may be determined.

Figure 6:
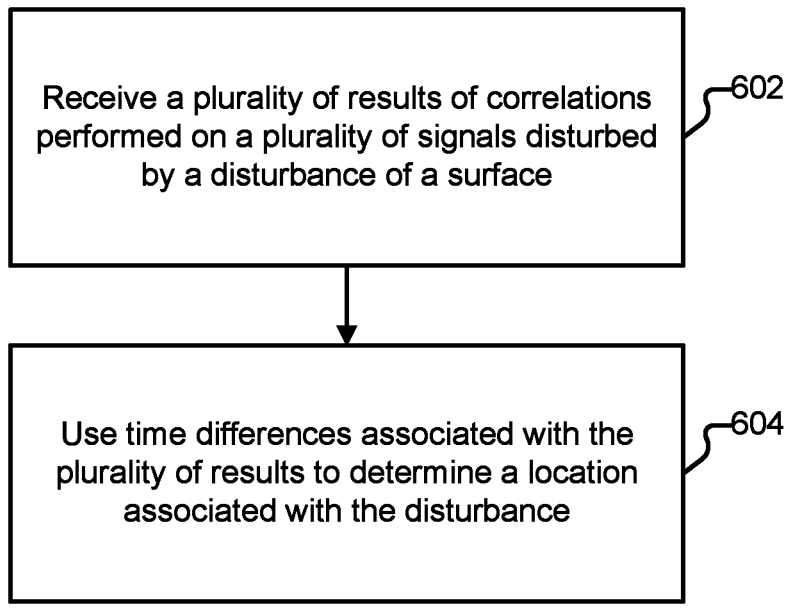
FIG. 6 is a flow chart illustrating an embodiment of a process for determining a location associated with a disturbance.

FIG. 6 is a flow chart illustrating an embodiment of a process for determining a location associated with a disturbance. In some embodiments, the process of FIG. 6 is included in 510 of FIG. 5. At 602, a plurality of results of correlations performed on a plurality of signals disturbed by a disturbance of a surface is received. For example, a result of the correlation performed at 508 of FIG. 5 is received. In some embodiments, a signal is propagated using transmitter 104 and sensors 114, 116, and 118 each receives the propagated signal that has been disturbed by a touch input on or near a surface of medium 102 of FIG. 1. The propagated signal may contain a predetermined signal and the predetermined signal is received at the various sensors. Each of the received signals is correlated with a reference signal to determine the results received at 602. In some embodiments, the received results are associated with a same signal content (e.g., same binary sequence) that has been freely propagated on a medium at the same time. In some embodiments, the received results are associated with different signal contents that have been disturbed by the same disturbance.

At 604, time differences associated with the plurality of results are used to determine a location associated with the disturbance. In some embodiments, each of the time differences is associated with a time when signals used in the correlation are most correlated. In some embodiments, the time differences are associated with a determined time delay/offset or phase difference caused on the received signal due to the disturbance. This time delay may be calculated by comparing a time value determined using a correlation with a reference time value that is associated with a scenario where a touch input has not been specified. The result of the comparison may be used to calculate a location of the disturbance relative to the locations of sensors that received the plurality of signals. By using the location of the sensors relative to a surface of a medium that has propagated the received signal, a location on the surface where the disturbance originated may be determined.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of determining a user indication, comprising:
   sending a signal to be used to propagate from a single transmitter, a propagating signal through a propagating medium with a surface;
   receiving a first received signal including the propagating signal that has been disturbed by a disturbance on the surface; and
   using a processor to process the first received signal to at least in part determine a user indication associated with the disturbance,
   wherein determining the user indication associated with the disturbance includes correlating with a first reference signal at least a first portion of the first received signal including a first binary sequence content to determine a first correlation result, correlating a second portion of the first received signal with a third reference signal to determine a third correlation result, and correlating with a second reference signal at least a portion of a second received signal including a second binary sequence content to determine a second correlation result, and the first reference signal, the second reference signal and the third reference signal are different reference signals.

2. The method of claim 1, wherein determining the user indication associated with the disturbance includes determining a location of the disturbance on the surface.

3. The method of claim 2, wherein the location of the disturbance is associated with a selected portion of the first received signal and processing the first received signal includes determining the selected portion.

4. The method of claim 1, wherein processing the first received signal includes comparing at least a portion of the first received signal to a reference signal.

5. The method of claim 4, wherein the reference signal is associated with an expected version of the first received signal if the first received signal has not been disturbed by the disturbance.

6. The method of claim 1, wherein the second portion of the first received signal was selected based at least in part the first correlation result.

7. The method of claim 1, wherein the second portion is a subset of the first portion identified using the first correlation result, and the third reference signal includes a more detailed version of a content included in the first reference signal.

8. The method of claim 1, wherein processing the first received signal includes comparing a predetermined reference time value with a time value determined using the first correlation result.

9. The method of claim 1, wherein processing the first received signal includes determining a delay caused on the first received signal by the disturbance.

10. The method of claim 9, wherein processing the first received signal includes comparing the delay with one or more other delays determined using other received signals disturbed by the disturbance.

11. The method of claim 1, wherein the propagating signal is an ultrasonic signal.

12. The method of claim 1, wherein determining the user indication includes determining a gesture associated with the user indication.

13. The method of claim 1, wherein determining the user indication includes determining a multi-touch input associated with the user indication.

14. The method of claim 1, wherein determining the user indication includes determining a force magnitude associated with the user indication.

15. The method of claim 1, wherein determining the user indication includes determining a pressure associated with the user indication.

16. The method of claim 1, wherein determining the user indication includes determining a size associated with the user indication.

17. The method of claim 1, wherein the propagating medium is coupled to a transducer that transmits the propagating signal.

18. The method of claim 1, wherein the signal to be used to propagate the propagating signal includes a pseudorandom binary sequence.

19. A system for determining a user indication, comprising:
   a communication interface configured to send a signal to be used to propagate from a single transmitter, a propagating signal through a propagating medium with a surface and receive a first received signal including the propagating signal that has been disturbed by a disturbance on the surface; and
   a processor coupled to the communication interface and configured to process the first received signal to at least in part determine a user indication associated with the disturbance,
   wherein determining the user indication associated with the disturbance includes correlating with a first reference signal at least a first portion of the first received signal including a first binary sequence content to determine a first correlation result, correlating a second portion of the first received signal with a third reference signal to determine a third correlation result, and correlating with a second reference signal at least a portion of a second received signal including a second binary sequence content to determine a second correlation result, and the first reference signal, the second reference signal and the third reference signal are different reference signals.

20. A computer program product for determining a user indication, the computer program product being embodied in a non-transitory tangible computer readable storage medium and comprising computer instructions for:

sending a signal to be used to propagate from a single transmitter, a propagating signal through a propagating medium with a surface;

receiving a first received signal including the propagating signal that has been disturbed by a disturbance on the surface; and processing the first received signal to at least in part determine a user indication associated with the disturbance, wherein determining the user indication associated with the disturbance includes correlating with a first reference signal at least a first portion of the first received signal including a first binary sequence content to determine a first correlation result, correlating a second portion of the first received signal with a third reference signal to determine a third correlation result, and correlating with a second reference signal at least a portion of a second received signal including a second binary sequence content to determine a second correlation result, and the first reference signal, the second reference signal and the third reference signal are different reference signals.

* * * * *